March 22, 1966     R. NOUEL     3,241,827
HIGH POWER HYDROMECHANICAL CLAMPS
Filed June 29, 1962     5 Sheets-Sheet 1
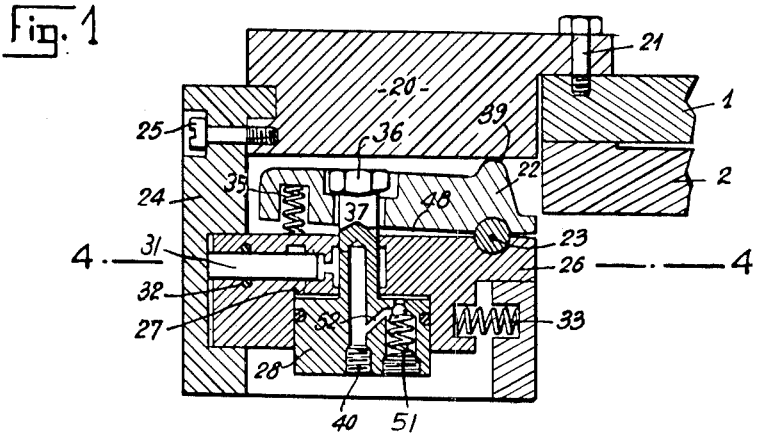
INVENTOR
Robert Nouel
BY
Theodore Bishoff
ATTORNEY

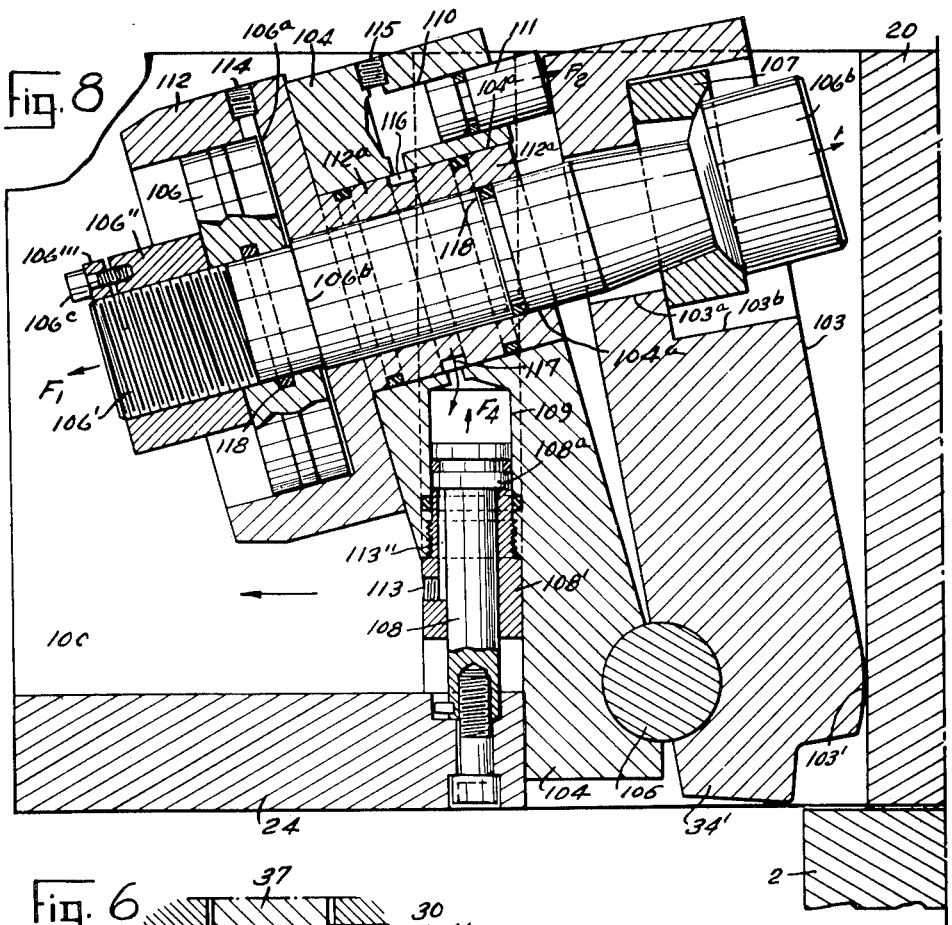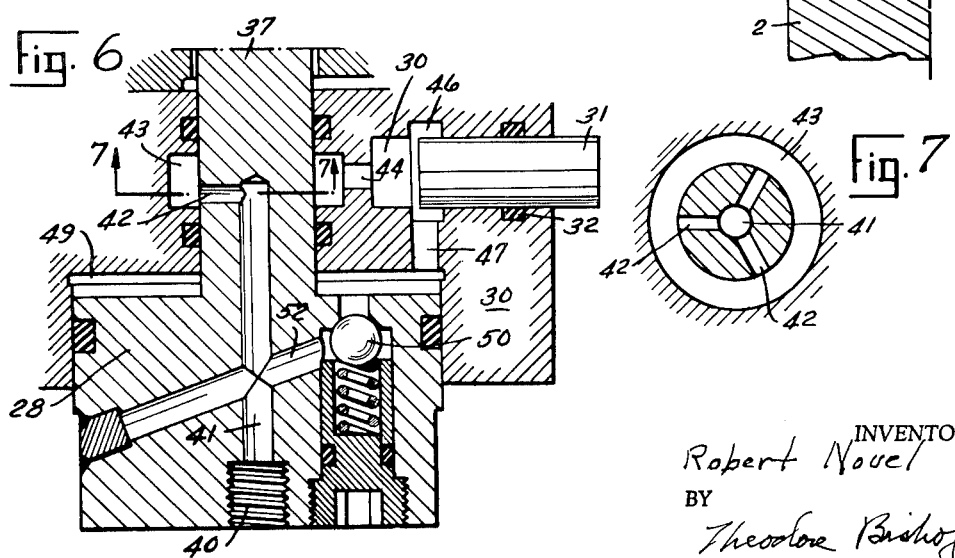

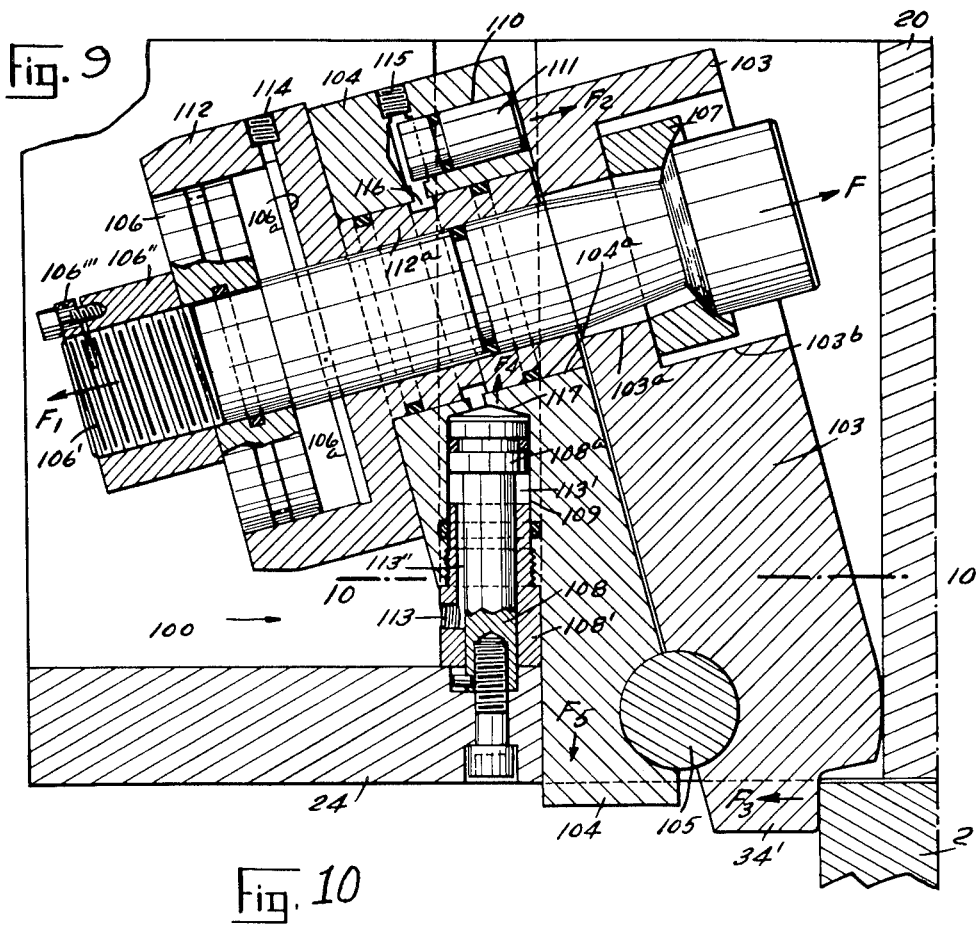

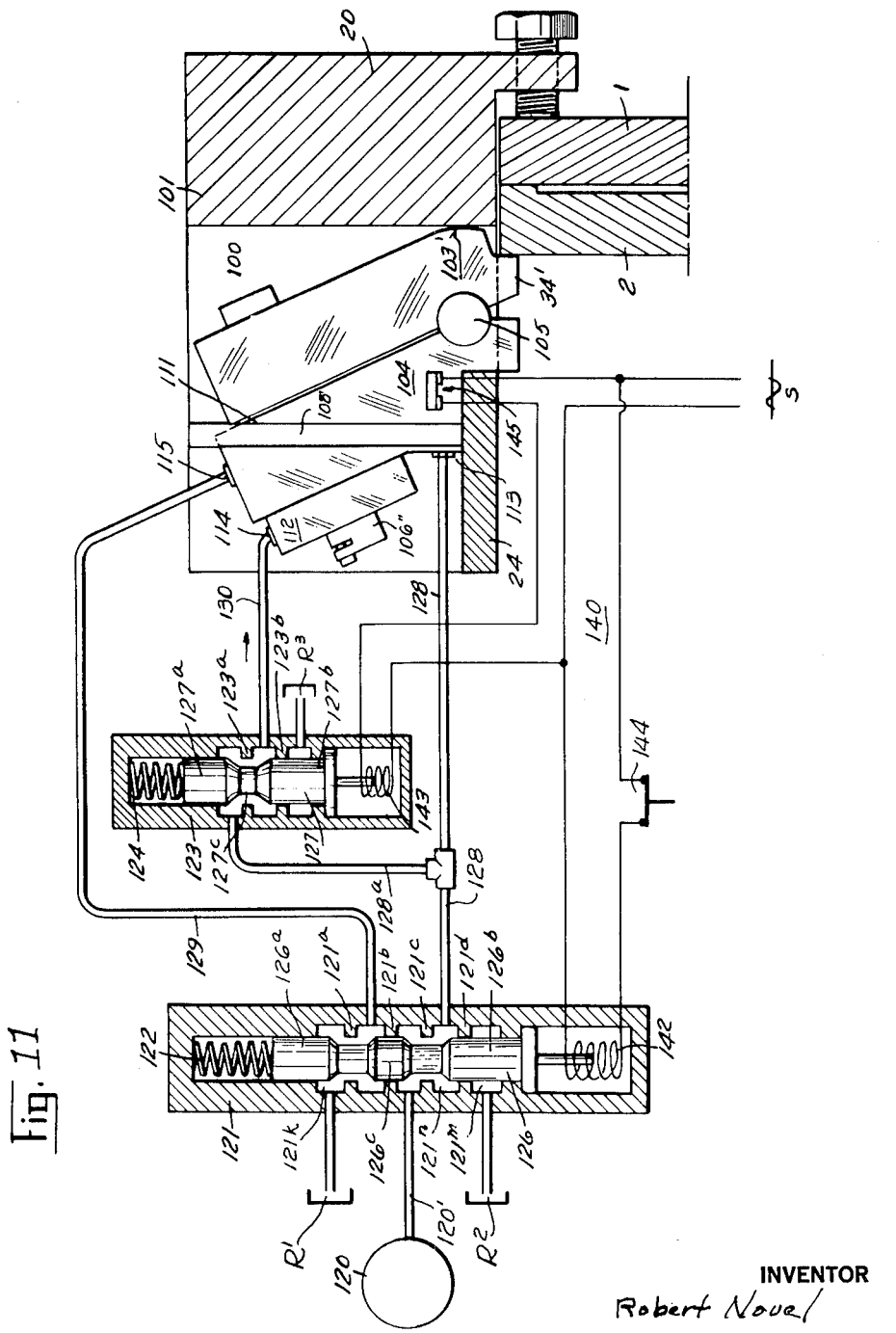

3,241,827
HIGH POWER HYDROMECHANICAL CLAMPS
Robert Nouel, Villejuif, France, assignor, by mesne assignments, to Inventions Finance Corporation, New York, N.Y., a corporation of Delaware
Filed June 29, 1962, Ser. No. 206,508
27 Claims. (Cl. 269—32)

This invention relates to a great power force applying apparatus for maintaining two or more parts of a machine or a die tightly and powerfully clamped against each other.

The present application is a continuation-in-part of my two pending applications Serial No. 173,103, filed February 13, 1962 entitled "Hydromechanical Clamps" and Serial No. 187,480, filed April 16, 1962, entitled "Hydromechanical Clamps," both such applications concerning force applying devices and methods. The present application comprises certain improvements over the devices disclosed in said co-pending applications, and more particularly, with a view to obtaining greater power, force or pressure with the same.

The hydromechanical force applying devices of the instant invention are applicable to virtually all types and sizes of machines for maintaining in proper engagement separable components of a given unit subjected to pressures tending to separate said components. These may comprise for instance, injection presses used for plastics and other machines for pressure molding, such as die presses, die stamping or forming presses, and casting units, wherein mold sections or the like, that tend to be moved away from each other by internal or external stresses are used.

Said invention is also applicable in the field of explosive forming and electrostatic forming of sheet metal, as well as in the fabrication of elements from high temperature metals, such as titanium, zirconium or any superalloy or refractory metal.

One important characteristic of the force applying devices of the instant disclosure resides in a means comprising a force multiplying lever and a fulcrum support therefor which move forward in a first stage to a position where one extremity of the lever is in holding or clamping position relative to the part to be held, while in a second stage, the other extremity of the lever is subjected to the action of a hydraulic piston which, as the result of a small tilting motion of the lever, produces the desired securing or clamping through the force multiplying action of the lever.

In my two above mentioned copending applications, I described the basic novel elements of my force applying devices and method in their original form, as well as their objects, advantages and construction. The instant application in contrast, presents an added explanation of a fluid pressure circulation system for each phase of the clamping operation and includes certain alternative embodiments which permit obtaining a higher power, force or pressure.

Additional novel characteristics of the invention will become more clearly apparent from the following description. Such description makes reference to the annexed drawings, wherein:

FIGURE 1 is a fragmentary vertical sectional view of a force multiplying hydromechanical device constructed in accordance with the present invention and showing the device with its clamping elements in retracted position;

FIGURE 2 is a corresponding sectional view of the force applying device of FIGURE 1 with the clamping element moved forward into the clamping position;

FIGURE 3 is another fragmentary sectional view of the device of FIGURE 1, but showing the multiplying lever component in the position it assumes during subsequent clamping operation;

FIGURE 6 is an enlarged fragmentary cross sectional view of the force applying device presenting in detail the fluid passageways and channels incorporated therein;

FIGURE 7 is a cross fragmentary sectional view taken through line 7—7 of FIGURE 6;

FIGURE 8 is a sectional view of an alternative embodiment of a heavy duty hydro-mechanical force applying device showing the device in the retracted position;

FIGURE 9 is a sectional view corresponding to FIGURE 8 with the parts thereof in clamping position;

FIGURE 10 is a transverse cross sectional view taken through line 10—10 in FIGURE 9, showing the constructional details of slideways supporting the unit;

FIGURE 11 is a schematic block diagram of the hydraulic and electrical system provided for operation of the embodiment shown in FIGURES 8–10.

In order to explain the operation of the invention and the fluid distribution by the hydraulic system hereof, the illustrative structure of the invention is presented in different stages or positions and reference is made to these positions, prior to discussing the structural aspects of each embodiment in detail.

*Position 1.*—In this position (FIGURE 1), the multiplying lever and cooperating elements are withdrawn from clamping position and the distribution of fluid is cut off. The return springs of the jaw acting on the slide maintain the slide retracted. The slide is however, ready to advance toward position 2, by distribution of fluid within the passageways between the central supply inlet and the intermediate channels therein. In position one, the slide control piston incorporated in the unit is at the end of its stroke and is about to compress the slide return spring of the unit.

*Position 2.*—In this position (FIGURE 2), the slide is in the advanced, non-clamping position, and the fluid (shown in the channels in horizontal dash lines), is now under pressure; the fluid has acted on the slide control piston and the return spring is compressed. The fluid under pressure bears on the lower side of the non-return ball valve disposed in the annular distribution channel (the passage being via the communication ports in the clamping piston rod), and also bears on the front face of the slide control piston which has compressed the return spring.

Figure 4:
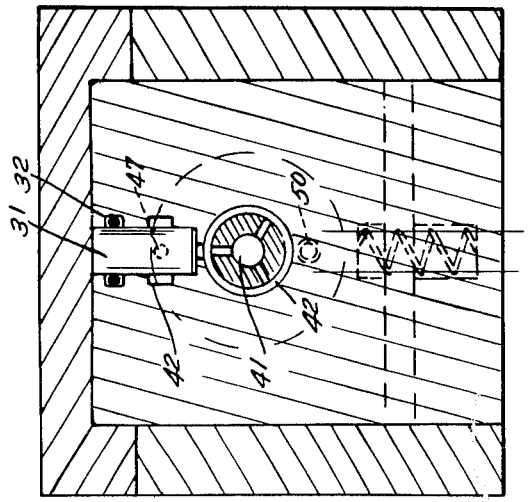
FIGURE 4 is a transverse cross sectional view of the device of FIGURE 1 taken on line 4—4 in FIGURE 1.
Figure 5:
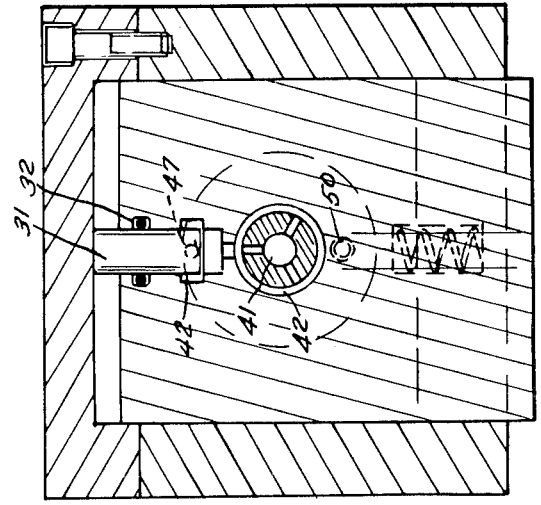
FIGURE 5 is a transverse cross sectional view of the same force applying device in a different position taken on line 5—5 in FIGURE 3.

*Position 3.*—This position (FIGURE 3), shows the slide and the multiplying lever carried thereby while the clamping action is occurring. The fluid under pressure has penetrated into the clamping piston chamber past the control piston, which has uncovered the distribution passageway to the clamping piston chamber. The cross-section of FIGURE 5 further shows how the control piston has compressed the return spring with the whole assembly under pressure. It also shows the passage of the fluid under pressure through the passageway which has been opened by the forward motion of the slide relative to the control piston.

By reference to the three positions of the force applying devices shown and described briefly above, the operation of the force clamping devices should be readily apparent.

The preferred embodiment of the force clamping devices will be better understood by referring to the drawings in greater detail. FIGURES 1, 2 and 3 show a hydromechanical force applying device comprising a body 20, engageable with a mold section 1, through bolt 21 and a force multiplying lever 22 fulcrumed about a cylindrical pin 23. A lateral plate 24, rigidly attached to the body 20 by means of bolts 25, carries a slide block 26 into which is mounted the pin 23 supporting the lever 22 for selective movement between positions. The slide block 26 has a fluid bore 27 therein, which bore serves as a passageway to the chamber 43 of a clamp positioning piston 31, the clamping piston being equipped with a sealing O-ring 32. Slide block 26 is urged toward plate 24 of the support structure by a compression spring 33. As a result, the clamping jaw end or extremity 34 of lever 22 is spaced from the mold section 2 in the position shown in FIGURE 1. Said lever 22 has its other extremity subjected to the action of a compression spring 35, which bears against block 26 and is carried in a recess in lever 22. Under the action of spring 35, lever 22 is urged clockwise as shown and bears, on nut 36 which serves as the upper terminal end of the stem 37 of clamping piston 28. As a result stem 37 urges piston 28 into its uppermost position.

Lever 22 which is fulcrumed about pin 23, is maintained on pin 23 by the vertically projecting lever portion 38 which is tangential to the inner face 39 of body 20 and normally spaced closely thereto.

In position one, lever 22 is inclined to the horizontal, and its extremity clamping jaw 34 is located at a level slightly below that of the lower face of mold section 2. Provision is made for adjustment of the spacing by the insertion of shims, if desired, beneath the bearing point adjacent bolt 21 of body 20 against mold section 1, or, alternatively, by means of a nut and screw adjustment system.

If, as is clearly shown in FIGS. 2 and 6, a pressure is exerted by means of a hydraulic circuit and a flexible line (not shown) connected at inlet coupling 40 of the clamp, the liquid under pressure will flow through passageway 41 in stem 37 and will then penetrate, via bore 42, annular channel 43 and bore 44 into cylinder chamber 46 and, against slide control piston 31.

Under the effect of this pressure, since the piston 31 abuts against lateral plate 24, the entire slide block 26 and components carried thereby will move in the direction indicated by arrow $F_1$ until the slide block abuts at 45 against the lower forward wall of block 20, while at the same time, compressing spring 33. Once this shift has been made, clamping jaw end 34 of multiplying lever 22 will be engaged beneath the extremity of mold section 2.

After slide block 26 has completed its travel, to clamping position, the fluid can flow into annular channel 46 opened by control piston 31, and through passageway 27 into chamber 49 which acts as a cylinder for piston 28. The piston 28 is forced by fluid passing through passageway 27 in the direction shown in FIGURE 3 by arrow $F_2$ and through the instrumentality of stem 37 and nut 36 the clamping piston pulls down lever 22, which causes said lever to tilt. The opposite clamping jaw extremity 34 of lever 22, then comes into contact with the lower extremity of mold section 2, which section is thereby powerfully clamped or thrust upwardly against mold section 1. This clamping action will be maintained as long as the hydraulic pressure fed at inlet coupling 40 is sustained.

When the hydraulic pressure is released, spring 35, which acts upon multiplying lever 22, nut 36 and stem 37, will cause piston 28 to rise in the direction opposite arrow $F_2$. The liquid in chamber 49 will unseat ball 50 which is subjected to the action of spring 51, and will flow out through the passageway 52 having the ball herein toward inlet coupling 40. Under the effect of spring 33, slide block 26 will simultaneously be thrust away in the direction opposite arrow $F_1$, and to a position against lateral supporting plate 24. The fluid which previously exerted its pressure against the end of piston 31, will drain through passageway 41 and the conduit connected to coupling 40.

When retracted, the clamping jaw end 34 of multiplying lever 22 provides free passage for mold section 2 laterally therepast. But once mold section 2 is applied against section 1, and piston 31 is thereafter thrust or immobilized against wall 24 by fluid pressure, the pressure in the hydraulic circuit suddenly increases and becomes sufficient, as seen in FIGURE 2, to shift slide block 26 in the direction of arrow $F_1$, and to subsequently act on piston 28 and effect the clamping shown in FIGURE 3. Thus, these two successive operations take place automatically and quickly, since the amount of pressurized fluid required is itself very small due to the small displacements involved and small sizes of the hydraulic components.

*Alternative embodiment for greater power application*

The construction of the hydro-mechanical device presented in FIGURES 8, 9, 10 and 11 represents an alternative embodiment to the devices of FIGURES 1-3. This embodiment provides very high force pressures, and incorporates various midifications in structural details to provide adequate strength. Certain component parts of the lower jaw of the clamping means have accordingly been replaced. The clamping piston 28 and nut 36 of the embodiment of FIGURES 1-3 have been replaced by a piston assembly 106, 106a, 106b. Since nut 36 is incompatible with very heavy pressures, it has been replaced by a ball-joint 107. The piston 28 integral with rod 37, is replaced by the piston 106, and its connection is in this case insured by nut 106″ which transmits the clamping pressure.

Furthermore, the various return actions have been made hydraulic. The piston 111 insuring return pivotal motion of the lever replaces spring 35. Return spring 33 which pulls back the block, and the block advancing piston 31, are replaced by a double-acting piston 108. Morover, in the alternate embodiment the hydraulic pressure is fed into chamber 113″ by means of coupling 113. From FIGURE 9, it may be seen that there is inter-communicating hydraulic pressure between inlets 115 and 117. As explained below, the hydraulic pressure operates simultaneously for withdrawal and pivotal motions.

Automatic distribution, insured by piston 31 through the medium of annular chamber 46 and port 27 in the preferred embodiment is achieved in the alternate embodiment by an electric limit switch and an electrically operative valve (FIGURE 11) which communicates the hydraulic pressure directly into the pivotal-motion and blocking chamber 106a. The provision for non-return through passageway 49 of the preferred embodiment becomes unnecessary in this case, the return taking place directly through the valve used to control the pressure throughout.

It will be noted that the slide block 26 of the preferred embodiment which fulfills several functions, is replaced by a slide block 104 serving as a slide and as a jaw proper. This slide does not incorporate means providing for fluid distribution and or a clamping cylinder, since in this instance an electrically operable valve and a separate slide block-cylinder 112, are provided. The lever action itself, however, remains unaltered.

Moreover, notwithstanding the replacements made of the parts above enumerated, the principle of the invention remains unchanged.

*Basic operation of the greater power force applying device*

FIGURES 8 and 9 represent sectional views of the high force applying device, of the alternate embodiment herein described. FIGURE 8 shows the unit in its retracted position. This structure is devoid of an internal distribution piston. The unit as a whole provides hydraulic return, hydraulic advance, hydraulic pivoting and hydraulic clamping. Synchronism between the advancing and pivoting motions is controlled externally. The hydraulic pressure is exerted against a double acting piston.

FIGURE 9 represents the unit of FIGURE 8 in clamping position, hydraulic pressure being exerted in both the return chamber and in the traction chamber of the double acting piston. The lever is here tilted by the hydraulic pressure exerted beneath the pivotal system. The position of the elements and the channels or spaces affected by the fluid pressure during the clamping action are clearly illustrated. With these two illustrations, one can appreciate the basic operation of the invention as modified and constructed as per the following detailed description.

The new embodiment of the invention disclosed in FIGURES 8-11 is intended for use where an extremely high clamping pressure is desired and, accordingly, is of a very rugged construction.

Referring to FIGURES 8, 9 and 11 the portions of the recess-forming structure, indicated at 20 and 24, correspond to the same parts 20 and 24 in the embodiment of FIGURES 1-7 and similarly from a recess 100 for a force applying mechanism, the recess being operatively and structurally positioned adjacent two relatively movable members herein disclosed, for example, as two complementary mold sections of a machine for molding plastics. Mounted on guides 119 in the recess (FIGURE 10) is a slide 104 which, like slide 26 of the first embodiment, is mounted for linear movement transversely of the longitudinal axis of the mold sections 1, 2 on the guides or slideways 119.

A force-multiplying lever 103 is pivotally mounted adjacent its lower end, noting FIGURES 8 and 9, on a fulcrum pin 105 carried by slide 104, the lower end of the lever 103 having a clamping jaw member 34' extending therefrom to engage with the lower mold section 2. Fulcrum pin 105 and lever 103 are held on slide 104 in proper seated position by means of an arcuate surface 103' concentric with the axis of pin 105 on the outer surface of the lever 103 and disposed adjacent to but slightly spaced from the inner adjacent surface of the recess-forming member 20 to provide free working clearance of the lever 103 throughout its pivotal movement on the slide 104.

To effect transverse movement of the slide 104 on its guideways 119, the slide at its lower end, noting FIGURES 8 and 9 has a cylindrical recess 109 which slidably receives a double-acting piston head 108a rigid with the upper end of a piston rod 108 and fixedly secured, by a bolt or the like in part 24 at the lower side of cylinder 109. The piston rod 108 slidably extends through a closure member 108' threadedly engaging and closing the opening lower or outer end of the cylinder 109. As indicated on the drawings, compression spaces 117 and 113' are formed by piston head 108a above and below it, respectively. Compression space 113' connects with a coupling connection 113 in the closure member 108' by means of a longitudinally extending channel 113'' formed by the members 108' and 108 for the admission of pressure fluid to compression space 113'.

Toward its upper end the transversely movable slide 104 has a large cross bore 104a in which a reduced diameter tubular extension 112a of a cylinder structure 112 is rigidly secured by a forcefit or the like. A piston rod or stem 106' is slidably mounted in the tubular extension 112a and at its left end has a piston 106 rigidly secured thereon, as by means of a shoulder 106''' and threaded nut 106'' locked on the threaded end of the piston rod by means of a locking device 106c. A coupling connection 114 in the wall of the cylinder structure 112 connects with the compression space 106a formed between the piston and inner end of the cylinder for the admission of pressure fluid thereto.

The opposite end of piston rod 106' is formed with an enlargement or head 106b having a spherical bearing surface seated in a complementary spherical bearing surface of a self-centering thrust bearing member 107 having an enlarged bore through which the piston rod 106' freely extends. Member 107, which together with the head 106b forms a ball joint for the piston rod 106' with the lever 103, in turn is seated in the enlarged portion 103b of a counterbore 103a located in the upepr end portion of the force multiplying lever 103 for limited free lateral centering movement within the portion 103b of the lever counterbore 103a.

A small open-ended cylinder 110 is formed in the end of the slide 104 above and generally parallel to crossbore 104a and has a piston 111 slidably mounted therein to project therefrom and engage at its outer end with the lever 103. A coupling connection 115 in the upper end face of the slide 104 connects with cylinder 110 for entry of pressure fluid thereto.

An annular channel 116 is formed in the outer periphery of the tubular extension 112a of the cylinder structure 112 and provides a connecting duct for the flow of pressure fluid between the compression space at the inner end of cylinder 110 and the compression chamber 117 above piston 108a in cylinder 109 of the slide 104.

As illustrated in the drawings, suitable fluid pressure sealing packings, such as that indicated at 118 in piston rod 106', are provided in annular grooves of pistons 106, 108a, 111, piston rod 106', cylinder 109 and cylinder tubular extension 112a, to seal against leakage of pressure fluid.

To actuate and control the disclosed force applying device, a system, such as shown schematically in FIGURE 11, is employed. As shown, there is provided a source of fluid pressure 120 having a fluid pressure line 120' connected to the central part of the casing of a flow control valve 121 in which is slidably mounted a pressure-balanced valve spool 126 having constant diameter cylindrical end sections 126a and 126b and a corresponding central section 126c with necked-down portions connecting the respective sections 126a, 126b and 126c. The flow controlling central portion of the casing of valve 121 is provided with four equally spaced flow obturating annular shoulders 121a, 121b, 121c and 121d which coact with the valve spool 126 to control fluid flow. In the illustrated position of the valve spool 126 the central spindle section 126c is in fluid flow obturating position relative to shoulder 121b.

Disposed within the casing of valve 121 and above valve spool 126 is a spool return spring 122. Also disposed within the valve casing and below the valve spool 126 is a solenoid device 142 comprising a part of a part of an electric actuating circuit 140 for moving the valve spool 126 to the illustrated pressure fluid flow position against the action of the compression spring 122 which is now compressed and biases the valve spool downwardly forcing the valve spool to its fluid releasing position when the electric circuit 140 is opened, as by means of a control switch 144 operated in any suitable manner. Valve chambers 121k and 121m, located respectively above and below annular flow controlling shoulders 121a and 121d, are connected to fluid return conduits $R^1$ and $R^2$ and with the low pressure side of the pressure source 120.

A pressure fluid conduit at its left end, as shown, extends from the valve space 121n between flow control shoulders 121c and 121d of valve 121 while at its opposite end the conduit 128 connects to coupling 113 of cylinder 109 of the slide 104. An intermediate branch 128a of pressure fluid conduit 128 connects with the casing of another pressure-balanced spool valve 123. A fluid flow conduit 129 at its left end in FIGURE 11 connects with the space between shoulders 121a and 121b of valve 121 while the other end of conduit 129 connects with coupling 115 of the slide cylinder 110. A return conduit R¹ to the pressure source 120 extends from the space 121k in valve casing 121 that is formed between the annular shoulder 121a and the upper end of the casing of the valve.

Pressure-balanced spool valve 123, like valve 121, comprises a casing slidably mounting a a similar pressure-balanced valve spool 127 having constant diameter cylindrical end sections 127a and 127b with a single reduced diameter central portion 127c. The flow controlling portion of this valve casing is provided with two equally spaced flow obturating annular shoulders 123a and 123b. When the associated solenoid 143 has the valve spool 127 to its upper position, as shown, the lower end section 127b is in flow closing position relative to the lower annular shoulder 123b.

Like valve 121, the valve 123 is provided with a valve spool return spring 124 positioned above the valve spool 127 while the solenoid 143 for actuating the valve against the biasing action of the spring 124 is located beneath the valve spool. The solenoid 143, which likewise comprises a part of the electric actuating circuit 140, is connected in series with the solenoid 142 of valve 121. The solenoid device 143 moves the valve spool 127 to the position shown when switch 144 is closed against the action of spring 124 which slides the valve spool downwardly to its lowermost position when switch 144 is opened.

Branch conduit 128a connects to the flow control space just above annular shoulder 123a of the valve 123 while another fluid flow conduit 130 is connected to one end of the flow control space between annular obturating shoulders 123a and 123b of the valve. The other end of conduit 130 connects with coupling 114 of the cylinder structure 112 of clamp slide 104. A return flow conduit R³ connects the control space below annular shoulder 123b of the valve with the low pressure side of the fluid pressure source 120.

The electrical control circuit 140 for the solenoid devices 142 and 143 of valves 121 and 123, which is energized from a suitable electrical energy source S further includes a safety pressure limit switch 145 in series with the solenoid devices 142 and 143, the switch 145 being mounted on the clamp slide 104 and in operative association with one of the fluid pressure chambers, such as cylinder compression space 113'.

In the operation of the force applying device, it is assumed that the complementary mold components 1 and 2 have been initially moved into closed or contracting relationship with each other by means not herein disclosed.

On the closing of switch 144 by any suitable means (FIGURE 11) the solenoid devices 142 and 143 are energized from the electrical source S to move each of valve spools 126 and 127 upwardly, against the resistance of their respective return spring 122 and 124, to the position illustrated.

High pressure hydraulic fluid thereby flows from the high pressure source 120 into a control chamber of valve 121 as defined by annular shoulders 121b and 121d and thence into conduit 128. A portion of the high pressure fluid flows directly into compression chamber 113' of piston cylinders 109 via coupling connection 113 and 113" while the remainder of the fluid flows by way of branch conduit 128a into the central part of valve 123 and thence into conduit 130, and coupling connection 114 and piston cylinder 106a of cylinder structure 112.

The flow of the high pressure fluid into cylinder compression space 113' of cylinder 109 reacts against fixed piston head 108a thereby thrusting slide 104 downwardly in the direction of arrow F₅ to the position shown (FIGURE 9). At the same time the flow of pressure fluid into coupling 114 thrusts piston 106 to the left in the direction of arrow F₁ which, through piston rod 106' and its self-centering ball joint 107, swings lever 103 counter- clockwise about its fulcrum 105 to thrust the jaw 34' on the lower end of lever 103 against the mold section 2 to thereby, in conjunction with recess forming members 20', 24', maintain mold components 1 and 2 together in intimate contact under high pressure.

Simultaneously with the flow of the high pressure fluid through conduits 128, 128a to couplings 113, 114, the hydraulic fluid which was in cylinder 110 flows therefrom via coupling 115 and conduit 129 to the valve control chamber 121k above annular shoulder 121b in valve 121 and thence back to the low side of the fluid pressure source 120 via return conduit R¹. It will be noted, as shown in FIGURE 11, that at this time return conduit R² of valve 121 is closed off from the high pressure fluid by annular shoulder 121d and, correspondingly, the annular shoulder 123b of valve 123 cuts off the low pressure return conduit R³ from the high pressure fluid in the valve control chamber above shoulder 123b.

In order to release and remove the force applying mechanism relative to mold sections 1, 2, when they are to be moved apart by means not shown, the switch 144 is opened manually or in any suitable manner, thereby de-energizing solenoid devices 142 and 143 respectively of valves 121 and 123 whereby the springs 122 and 124 then impel the respective valve spools 126 and 127 to their lower-most positions.

In the lowered position of valve spool 126 of valve 121, the conduit 129 is thereby connected to the high pressure side of the pressure fluid source 120 to apply pressure fluid to piston 111 in cylinder 110 to rotate lever 103 clockwise and release the jaw 24' from mold section 1 since central valve spool section 126a and 126c of spool 126 close off return flow conduits R¹, R² at shoulders 121a and 121c, respectively.

A portion of the high pressure fluid flowing into cylinder 110 (FIGURE 8) flows into the annular channel 116 around the tubular extension 112a of the cylinder structure 112 and into cylinder chamber 117 above piston head 108a in slide cylinder 109. It there reacts against the piston head and forces the slide 104 to move upwardly in the direction of the arrow F₄ away from and free of the mold section 2.

Simultaneously, the valve spool section 126c, by closing off high pressure fluid flow across annular shoulder 121c, thereby connects conduit 128, and hence coupling 113 of pressure chamber 113² of slide cylinder 109, to the low pressure side of the fluid pressure source via return conduit R² to permit free movement of slide 104 in the direction of the arrow F₄.

Also simultaneously, by the spring-impelled movement of valve 123, along with that of valve 121, to its lowermost position, the spool section 127a of the valve spool 127 is in obturating position across annular shoulder 123a, the high pressure fluid in cylinder 106a flows to the low pressure side of the fluid pressure source 120 by flowing past annular shoulder 127b of the valve 123 to return fluid conduit R³ which permits the piston 110 to pivot lever 103 in the direction of arrow F₂ to release the clamping jaw 34' from the mold section 2.

*Structural considerations and security of operations*

If one were to attempt to achieve with known methods the same result as that obtained with the hydro-mechanical force applying devices herein described, one would discover that clamping levers fulcrumed about a stationary pin, would have to have an angular travel of about 90°, in order to enable the tip of the lever to retract and allow free passage of the mold. Furthermore, a stationary pin capable of withstanding the same clamping force as a hydro-mechanical clamp of any given type or force, would be subjected to bending and shearing and would be widely spaced from the mold. The lengths of the lever arms would also be large and any hydraulic operating piston would require a very long stroke. Assuming identical working conditions as those stated hereinbefore, the piston would require for example a stroke of 100 mm.

instead of 5 mm., but even then the clamping device would necessarily be so bulky and heavy as to be extremely difficult to adapt to a press, die or mold. In fact they would be heavier and bulkier than the standard presses presently in use, and would consume a prohibitive quantity of energy.

Nor could the above attempt or experiment be considered safe, for, if for any reason the lever were to be operated before the mold had fully closed, irreparable damage could result.

This would not be in the case in the force multiplying hydro-mechanical devices of the invention, as the forward motion of slide block 26 in the direction of $F_1$ is stopped immediately as soon as said slide abuts against the lateral face of mold section 2. Without proper positioning as described, the annular space or channel 46 *cannot* be supplied with fluid, and piston 28 *cannot* become operative.

In view of all the above, it will be noted that the force applying devices of the present invention, whether in the original or in the alternative embodiment, are outstandingly effective by reason of their numerous advantages and properties which include: their small over all size and high force to weight ratio: their small power consumption and instantaneous response and their high degree of safety and inherently sequential operation. To mention only these factors is sufficient to demonstrate the outstanding advance in the art.

After reading the foregoing detailed description of the preferred and illustrative embodiments of the invention, it should be readily appreciated that the objects set forth at the outset of this specification have been successfully achieved. Various modifications may occur to those of ordinary skill in the art and the clamping devices may have other alternative embodiments than those specifically suggested. For example, one could replace piston 31 of FIGURE 1 by a cam means so as to move slide block 26, and replace spings 33, 35 by return pistons hydraulic or pneumatic. Regardless of these modifications, it should be apparent that I am not limiting myself to such details except as required by the scope of the claims.

I claim:

1. A device of the character described to apply force to an object, said device including support means mounting force applying means, said force applying means comprising lever means for exerting a force on the object greater than a force applied to said lever means, and first, second and third piston means mounted on said support means said support means together with said force applying means being movable as a unit to a force applying position relative to the object and to a position for releasing the object.

2. A force applying device adapted to maintain separable parts of an apparatus in engagement with one another, said force applying device comprising a support structure including a slide member slidably mounted on said support structure and carrying a fulcrum thereon, a lever mounted on said fulcrum, fluid pressure responsive means comprising first piston and cylinder means for moving said slide member, second piston and cylinder means cooperating with said slide member and said lever for pivotally moving said lever in one direction about said fulcrum, and ball joint means for coupling said second piston with said lever to provide for universal movement therebetween.

3. A force applying device as defined in claim 2 wherein said first piston and cylinder means includes a double acting piston head, and an inlet to said first piston and cylinder means on one side of said head, said piston head being operatively fixed relative to said support structure whereby feeding fluid under pressure to said first piston and cylinder means causes sliding of said slide support member toward a position where said lever is engageable with one of said parts.

4. A device as defined in claim 2 wherein said second piston and cylinder means comprises a piston chamber fixed to said slide member, a piston head having a stem reciprocal in said chamber and means coupling said head to said stem, said chamber having an inlet thereto on the side of said piston head adjacent said slide member.

5. A device as defined in claim 2 and further including third piston and cylinder means for pivoting said lever about said fulcrum in a direction opposite said one direction whereby fluid flows under pressure to said third piston and cylinder means from said first piston and cylinder means to move said slide member toward a position where said lever is free of the separation path of the separable parts.

6. A clamping device as defined in claim 5 wherein all of said piston and cylinder means are caried in said slide member.

7. A clamping device as defined in claim 5 wherein said slide member includes passageway means therein providing fluid communication between said first piston and cylinder means and said third piston and cylinder means.

8. A device as defined in claim 2 and further including a unitary supply means for supplying fluid under pressure, and valve means for selectively supplying fluid to said first and second piston and cylinder means sequentially.

9. A device as defined in claim 8 wherein said valve means includes multipassage valves, solenoid means for selectively operating said valves, and switch means responsive to sliding of said slide member for activating said solenoid means.

10. A device as defined in claim 9 wherein said valve means includes first and second multipassage valves, said second multipassage valve being fluid coupled to said second piston and cylinder means, said first multipassage valve being fluid connected to said supply means and to said first piston and cylinder means, and to said second valve.

11. In a clamping arrangement adapted for clamping die parts arranged to be clamped together, a movable structure comprising support means and force multiplying lever means fulcrumed thereon, means mounting said support means for movement laterally toward and away from the die parts when said parts are being clamped and unclamped by power actuated pressure means controlled by electrically responsive valve means, said power actuated pressure means controlled by said valve means causing said lever means to pivot on its fulcrum whereby it is adapted to clamp the die parts together.

12. A clamp arrangement for engaging separable parts to be clamped together and comprising a body structure having clamping components, one of said components comprising at least two members, one of said members being reciprocally translatable along a path of movement transverse to the separation path of said parts when said parts are disengaged, the other of said members being reciprocally translatable with and fulcrumed intermediate its length on said one member to forcibly engage and releasably clamp said parts between said clamping components, power pressure means for reciprocably translating both said members and electrically controlled valve means controlling said power pressure means.

13. A heavy duty clamping arrangement for maintaining relatively separable structures adapted to provide a die cavity or the like in contacting relation comprising, clamping jaw means, first means for moving said clamping jaw means between retracted non-clamping and forward clamping positions, second means for actuating said clamping jaw means into clamping engagement with the closed separable structures, fluid duct means inter-connecting both said first and second mentioned means with a source of pressure fluid, and power-actuated pressure balanced valve means for controlling both said first and second mentioned means.

14. A clamping arrangement as defined in claim 13 wherein said source of pressure fluid is common to both said first and second mentioned means, and said power-actuated valve means comprise a plurality of control means having electrical actuating means therefor connected in a common electrical circuit for simultaneous actuation.

15. A clamping arrangement as defined in claim 14 wherein said plurality of control means comprise two interconnected fluid flow pressure balanced valve units, said electrical actuating means being operative to actuate each of said valve units for controlling flow of pressure fluid therethrough to actuate said clamping jaw means into both forward position and clamping engagement when said electrical circuit is energized.

16. A clamping arrangement as defined in claim 15 wherein said valve units include resilient means controlling fluid flow therethrough to release said clamping jaw means relative to said closed separable structures when said electrical circuit is de-energized.

17. Heavy duty clamping mechanism for maintaining relatively separable structures in contacting engagement comprising, a plurality of relatively pivoted means, clamping jaw means on at least one of said relatively pivoted means, power means including ball swivel means having spherical contact surfaces mating with like surfaces on said relatively pivoted means to effect free lateral movement therebetween, and means for actuating said power means to effect engagement of said clamping jaw means with said separable structures.

18. Heavy duty clamping mechanism as defined in claim 17 wherein said plurality of relatively pivoted means comprises a fulcrumed force-multiplying lever, said lever having said clamping jaw means thereon at one end thereof.

19. Heavy duty clamping mechanism as defined in claim 18 wherein said power means comprises piston rod means having one part of said ball swivel means on one end thereof and a piston head on the opposite end thereof, the remainder of said ball swivel means being mounted on the other end of said lever remote from its fulcrum.

20. A heavy duty clamping mechanism for engaging separable parts to be clamped, comprising a body having two jaws, one of said jaws comprising two members, both said members being reciprocally movable along a path transverse to the separation path of said parts when said parts are disengaged, one of said members being pivotal on the other of said members to engage and forcibly, releasably clamp said parts together in a direction opposite the direction in which said force is exerted, and fluid pressure means for moving both said members along said path and for pivoting said one member in opposite directions.

21. Heavy duty clamping mechanism as defined in claim 17 wherein said plurality of pivoted means includes a fulcrumed force-multiplying lever, said ball swivel means being mounted on said lever remote from and to one side of its fulcrum, said clamping jaw means being mounted on said lever and located at the opposite side of its fulcrum, said power means compressing a cylinder means operably receiving a piston head connected to said ball swivel means, and a valve-controlled pressure system connected to said cylinder means.

22. Heavy duty clamping mechanism as recited in claim 21 wherein there is additionally provided means for guiding said relatively pivoted means for straight line back and forth movement thereon, a second power means for moving said relatively pivoted means in its back and forth movement between retracted clamp release and forward clamp engaged positions, said first mentioned power means actuating said relatively pivoted means to release said jaw means from clamp-locking engagement with said separable structures, third power means operable to move said relatively pivoted means from jaw engagement with said separable structures, means connecting a source of fluid pressure with said first, second and third power means and valve means in said connecting means, said first, second and third power means being simultaneously responsive to the actuation of said valve means.

23. A heavy duty clamping mechanism as defined in claim 22 wherein said valve means include actuating means comprising part of an electric circuit, means in said electric circuit effecting simultaneous actuation of all of said power means.

24. In a clamping arrangement for maintaining closed separable structures, clamp means comprising at least one retractable clamp jaw means, comprising a movable fulcrumed force multiplying lever means mounted on a lever support, said multiplying lever means and said lever support being movable as a unit from a position outside the path of separation of said separable structures to a position within said path, said clamp means being engageable with one of said separable structures to be clamped, said clamp means including electrically controlled power means operative for actuating said lever means to maintain said separable structures closed.

25. A clamping arrangement as defined in claim 24 including means cooperating with said electrically controlled power means and said lever means for effecting pivotal motion of said lever means and withdrawal movement of said lever means and said lever support.

26. In a clamping arrangement for maintaining closed separable structures, clamp means comprising a plurality of retractable jaw means, a portion of each said jaw means comprising a fulcrumed force multiplying lever adapted to be pivoted to apply a clamping force to said separable structures in one direction, another portion of said jaw means carrying said lever and being movable in a direction transverse to said one direction to dispose said lever to engage one of said separable structures, power activating means on said other portion of said jaw means to maintain said separable structure closed and electrically-activated means controlling said power means to sequentially effect said transverse and pivotal motions of said portions of said jaw means.

27. A clamping arrangement for separable parts to be held contactingly together by a clamping force applied in one direction, said arrangement comprising a base structure, a rectilinearly movable member on said base structure, a force multiplying lever means adapted to apply said clamping force in said one direction and said member carrying said lever means, said member being movable on said base structure in directions transverse to said one direction, and power actuated means for moving said member in said transverse directions.

References Cited by the Examiner

UNITED STATES PATENTS

| 2,363,107 | 11/1944 | Young | 18—43 X |
| 2,398,178 | 4/1946 | Ellison. | |
| 2,475,304 | 7/1949 | Bariffi. | |
| 2,668,325 | 2/1954 | Goodwin | 18—30 |
| 2,671,247 | 3/1954 | Lester | 18—30 |
| 2,775,790 | 1/1957 | Lappin et al. | 18—43 X |
| 2,783,838 | 3/1957 | Ericson et al. | 269—25 X |

LESTER M. SWINGLE, *Primary Examiner.*

MICHAEL V. BRINDISI, ROBERT C. RIORDON,
*Examiners.*

J. H. FLINT, F. J. POWERS, *Assistant Examiners.*